United States Patent
Lee

(10) Patent No.: US 6,950,515 B2
(45) Date of Patent: Sep. 27, 2005

(54) TELECOMMUNICATION SYSTEM USING DIGITAL-SUBSCRIBER LINES COEXISTING WITH TCM-ISDN LINES

(75) Inventor: Jung-Joo Lee, Seoul (KR)

(73) Assignee: Samsung Electronics, CO, Suwon (KR)

( * ) Notice: Subject to any disclaimer, the term of this patent is extended or adjusted under 35 U.S.C. 154(b) by 323 days.

(21) Appl. No.: 10/338,477

(22) Filed: Jan. 8, 2003

(65) Prior Publication Data

US 2003/0128835 A1 Jul. 10, 2003

(30) Foreign Application Priority Data

Jan. 8, 2002 (KR) ........................................ 2002/00963

(51) Int. Cl.$^7$ ................................................ H04B 3/32
(52) U.S. Cl. ...................................... 379/417; 370/201
(58) Field of Search ........................... 370/201; 379/417

(56) References Cited

U.S. PATENT DOCUMENTS 6,628,704 B1 * 9/2003 Long et al. ................. 370/292

* cited by examiner

*Primary Examiner*—Sinh Tran
*Assistant Examiner*—Daniel Swerdlow
(74) *Attorney, Agent, or Firm*—F. Chau & Associates, LLC

(57) ABSTRACT

Provided is an asymmetric digital subscriber line (ADSL) system that communicates via digital subscriber line (DSL) routing through a bundle of cables including a communication line for time compression multiplexing-integrated services digital network (TCM-ISDN) system that is synchronized with a TCM timing reference (TTR) signal. The ADSL system is synchronized with a data signal inputted after the TTR indication signal.

7 Claims, 10 Drawing Sheets

Fig. 5

| TTR$_C$ | 0 | 1 | 2 | 3 | 4 | 5 | 6 | 7 | 8 | 9 |
|---|---|---|---|---|---|---|---|---|---|---|
| 0 | 0 | 1 | 2 | 3 | 4 | 5 | 6 | 7 | 8 | 9 |
| 1 | 10 | 11 | 12 | 13 | 14 | 15 | 16 | 17 | 18 | 19 |
| 2 | 20 | 21 | 22 | 23 | 24 | 25 | 26 | 27 | 28 | 29 |
| 3 | 30 | 31 | 32 | 33 | 34 | 35 | 36 | 37 | 38 | 39 | 40 |
| 4 | | 41 | 42 | 43 | 44 | 45 | 46 | 47 | 48 | 49 | 50 |
| 5 | | 51 | 52 | 53 | 54 | 55 | 56 | 57 | 58 | 59 | 60 |
| 6 | | 61 | 62 | 63 | 64 | 65 | 66 | 67 | SS | 69 | 70 |
| 7 | | 71 | 72 | 73 | 74 | 75 | 76 | 77 | 78 | 79 | 80 |
| 8 | | 81 | 82 | 83 | 84 | 85 | 86 | 87 | 88 | 89 | 90 |
| 9 | 91 | 92 | 93 | 94 | 95 | 96 | 97 | 98 | 99 | 100 |
| 10 | 101 | 102 | 103 | 104 | 105 | 106 | 107 | 108 | 109 | 110 | 111 |
| 11 | | 112 | 113 | 114 | 115 | 116 | 117 | 118 | 119 | 120 | 121 |
| 12 | | 122 | 123 | 124 | 125 | 126 | 127 | 128 | 129 | 130 | 131 |
| 13 | | 132 | 133 | 134 | 135 | 136 | SS | 138 | 139 | 140 | 141 |
| 14 | 142 | 143 | 144 | 145 | 146 | 147 | 148 | 149 | 150 | 151 |
| 15 | 152 | 153 | 154 | 155 | 156 | 157 | 158 | 159 | 160 | 161 |
| 16 | 162 | 163 | 164 | 165 | 166 | 167 | 168 | 169 | 170 | 171 | 172 |
| 17 | | 173 | 174 | 175 | 176 | 177 | 178 | 179 | 180 | 181 | 182 |
| 18 | | 183 | 184 | 185 | 186 | 187 | 188 | 189 | 190 | 191 | 192 |
| 19 | | 193 | 194 | 195 | 196 | 197 | 198 | 199 | 200 | 201 | 202 |
| 20 | 203 | 204 | 205 | SS | 207 | 208 | 209 | 210 | 211 | 212 |
| 21 | 213 | 214 | 215 | 216 | 217 | 218 | 219 | 220 | 221 | 222 |
| 22 | 223 | 224 | 225 | 226 | 227 | 228 | 229 | 230 | 231 | 232 |
| 23 | 233 | 234 | 235 | 236 | 237 | 238 | 239 | 240 | 241 | 242 | 243 |
| 24 | | 244 | 245 | 246 | 247 | 248 | 249 | 250 | 251 | 252 | 253 |
| 25 | | 254 | 255 | 256 | 257 | 258 | 259 | 260 | 261 | 262 | 263 |
| 26 | | 264 | 265 | 266 | 267 | 268 | 269 | 270 | 271 | 272 | 273 |
| 27 | 274 | SS | 276 | 277 | 278 | 279 | 280 | 281 | 282 | 283 |
| 28 | 284 | 285 | 286 | 287 | 288 | 289 | 290 | 291 | 292 | 293 |
| 29 | 294 | 295 | 296 | 297 | 298 | 299 | 300 | 301 | 302 | 303 |
| 30 | 304 | 305 | 306 | 307 | 308 | 309 | 310 | 311 | 312 | 313 | 314 |
| 31 | | 315 | 316 | 317 | 318 | 319 | 320 | 321 | 322 | 232 | 324 |
| 32 | | 325 | 326 | 327 | 328 | 329 | 330 | 331 | 332 | 333 | 334 |
| 33 | | 335 | 336 | 337 | 338 | 339 | 340 | 341 | 342 | 343 | SS |

▓ FEXT$_R$ data symbol      ☐ NEXT$_R$ data symbol

TELECOMMUNICATION SYSTEM USING DIGITAL-SUBSCRIBER LINES COEXISTING WITH TCM-ISDN LINES

BACKGROUND

1. Field of the Invention

The present invention relates to a telecommunication system, and more particularly to an asymmetric digital subscriber line (ADSL) system using a digital-subscriber line coexisting with a communication line for a time-compression multiplexing integrated services digital network (TCM-ISDN) line system.

2. Discussion of Related Art

In recent years, communication methods that are capable of facilitating high-speed data communications and minimal installation costs and user fees have become imperative to meet requirements for high-speed communications via Internet between users of personal computers. As a result, a Digital Subscriber Line and its variations (xDSL) system has been proposed. The xDSL system enables digital data communications by using existing general copper phone lines installed in homes and offices.

The "xDSL" system, which generally refers to all kinds of communication methods using phone lines, includes a High data-rate DSL (HDSL) system taking the place of existing T1 lines, a Symmetric DSL (SDSL) system taking the place of T1 or E1 lines by using a single twisted-pair copper line, an Asymmetric DSL (ADSL) system capable of transmitting high-capacity data by a public switched telephone network (PSTN).

In an ADSL system, the word 'asymmetric' is named because downstream data transmitted from a central office (CO) to remote terminals (RT) has wider bandwidth and more capable of data transmission than upstream data transmitted from the remote terminals to the central office. The ADSL system uses current phone lines or telephones as it is and enables high-speed data communications. Also, in the ADSL system, it is capable of data communications and a Plain Old Telephone Service (POTS), simultaneously. The ADSL system provides a transmitting speed of up to 8 Mbps in a downstream direction and that of up to 640 Mbps in an upstream direction.

The transmission of data in an xDSL system needs wider bandwidth and thus creates higher cross-talk interference between copper pairs in the same cable-binder group. The level of the crosstalk interference varies depending on different cable structures and materials. In particular, some countries such as Japan and Korea use telephone cables with a paper-based "pulp" insulator rather than plastic-insulated cables (PIC) used in the United States. These pulp cables produce much more cross-talk interference than the PIC cables. Thus, it is more difficult to provide wide-band DSL services in those countries which use the pulp cables because their existing telephone cables are prone to crosstalk interference.

FIG. 1 is a diagram of conventional ISDN line telecommunication system which has interference.

A central office 10 contains several Integrated Services Digital Network (ISDN) line cards 11 that connect a telephone network backbone to. local lines 20 that are strung to equipments of users. Remote ISDN terminal adapters or modems 30 are located at different remote customer sites within a few kilometers of the central office 10.

Local lines from ISDN line cards 11 to remote ISDN modems 12 are routed through one or more cable bundles 12. These telephone-cable bundles 12 may contain dozens or more separate telephone lines or copper pairs. Standard voice services, ISDN services, and newer DSL services share the same cable bundle. Since lines run close to other lines in cable bundles 12, mutual inductances can create cross-talk interference or noise between lines 20. For voice services such as Plain Old Telephone Service (POTS), frequencies are so low that interference is negligible. However, interference cannot be neglected in ISDN digital services using a higher bandwidth of around 80 to 320 kHz. New xDSL services also use higher bandwidths. For example, bandwidths of an ADSL system are typically above 1 MHz and have significant cross-talk interference. To prevent this cross-talk interference in countries such as the U.S., where better-insulated PIC cables are used, a full-duplex data transmission system having echo cancellation has been employed.

To eliminate the cross-talk interference in countries such as Japan, where the pulp cables are installed, a time-compression multiplexing (TCM) ISDN line system is used rather than the full-duplex data transmission system having echo-cancellation. The Operation of TCM-ISDN line system is based on a TCM timing reference (TTR) signal of 400 Hz. In such a system, the ISDN line cards at the central office transmit data when the TTR signal is at an active high. The ISDN line cards all receive data from ISDN modems during a different time period. Thus, near-end cross-talk (NEXT) interference is eliminated because none of the other ISDN cards at the central office are receiving data during the transmission time-period. Although far-end crosstalk (FEXT) interference still exists, it is usually much weaker than NEXT interference.

FIG. 2 is a timing diagram for a TCM-ISDN line system. During window 22, data is output from a central office to a remote ISDN modem installed in customer premises. This data arrives at the remote modem after a predetermined delay, during reception window 24. An ISDN equipment of the customer premises includes a burst clock detector (not shown) to determine the timing of a receive downstream burst and to generate the timing for a transmit upstream burst thereof. During window 26, upstream data is transmitted from the remote modem to the central office, which arrives at the central office after a predetermined delay, during window 28. At any particular time, only one end of the TCM-ISDN line system is transmitting data, while the other end is receiving data. An echo cancellator is not needed because a transmitted signal does not have any echo that has to be removed.

As an ADSL system as well as the existing public switched telephone network (PSTN) enable super-speed communications, data communications under other circumstances such as established ISDN and TCM-ISDN has been proposed so that an ADSL Annex B system and an ADSL Annex C system were developed. The ADSL Annex B system is a variation of the ADSL system in which frequency bandwidth of upstream data is not contained in that of ISDN to use the ADSL system under ISDN. The ADSL Annex C system is designed for using the ADSL system under TCM-ISDN of half-duplex data transmission system used in countries such as Japan.

ADSL services use a full-duplex data transmission system. Therefore, a receiver at either side receives data all the time. If such an ADSL modem and the TCM ISDN are installed in the same cable bundle, the strong near-end cross-talk (NEXT) interference due to TCM ISDN modems will severely affect the reception of the ADSL signal during the transmission of data.

FIG. 3 is a diagram of interference at a central office when several ISDN lines transmit data at the same time. During transmit window 22 of FIG. 2, a burst of data is sent from the central office to remote sites. Near-end crosstalk (NEXT) interference of the ADSL modem at the central office is particularly strong during transmit window 22, when the ISDN devices at the central office are all transmitting data. During receive time window 28, these ISDN devices at the central office are not transmitting data. Far-end-crosstalk (FEXT) interference is weaker than NEXT interference because it is attenuated by the length of the telephone line. However, in the customer premises ISDN modem, near-end crosstalk (Next) interference during the transmission of data is stronger than FEXT interference during the reception of data.

Accordingly, the ADSL modem installed with TCM-ISDN in the same cable bundle has to be designed such that ADSL signals are transceived in consideration of FEXT interference and NEXT interference. Dual bit-map (DBM) and FEXT bit-map (BBM) minimize NEXT interference. DBM uses different bit-map according to FEXT/NEXT interference period, and BBM which uses singular bit map transmits data only at a period of FEXT interference which is weaker than NEXT interference. When ADSL services are provided in a situation of TCM-ISDN, Next interference is stronger than FEXT interference throughout the whole bandwidth. In this situation, precise network time synchronization can be performed between ADSL and TCM-ISDN services, and data transmission may be maximized when data is transmitted in a DBM type.

As described above, in TCM-ISDN, data is transmitted from a central office to a remote terminal when a TTR signal is at a high level. Inversely, data is transmitted from the remote terminal to the central office when the TTR signal is at a low level. However, since ADSL modem cannot directly use the TTR signal of the TCM-ISDN modem, the TTR signal is transmitted as the downstream data with a certain frequency during the initialization. For example, the central office according to ADSL Annex C transmits pilot tone of 276 kHz and TTR indication tone of 207 kHz at the same time. The remote terminal performs clock synchronization using the pilot tone. According to a hyperframe synchronized with the TTR signal, phase information of +45° during FEXT interference period and phase information of −45° during NEXT interference period are included in the TTR indication tone by the central office. Accordingly, the remote terminal analyzes a received TTR indication signal of 207 kHz and determines the phase information on FEXT interference and NEXT interference periods to constitute a hyperframe of a received frame.

FIG. 4 is a diagram illustrating hyperframe symbols of ADSL downstream signals, and 345 symbols constitute one hyperframe. One hyperframe includes 345 frames and 1 symbol represents a symbol of a frame. Here, a period of a hyperframe is 85 ms, which is a multiple (i.e. 34 times) of a period (2.5 ms) of a TTR signal. Although FIG. 4 illustrates an example of a hyperframe including a cyclic-prefix, the foregoing description may be also applied to a hyperframe including no cyclic-prefix. But, at this time, a period of one hyperframe (345 symbols) is 80 ms.

FIG. 5 is a table illustrating one hyperframe of an ADSL signal during 34 periods of a TTR signal. A slant-lined region is a symbol representing FEXT interference period, and the other region is a symbol representing NEXT interference period. Here, a symbol is determined to be FEXT interference or NEXT interference on the basis of vertical dotted lines.

FIG. 6 is a timing diagram exemplarily illustrating that a remote terminal recognizes a symbol included in a TTR indication signal transmitted from a central office. The ADSL central office according to ADSL Annex C is synchronized with the TTR signal of TCM-ISDN during the communication initialization and generates a hyperframe. The ADSL central office stores symbols of the hyperframe in a signal of 207 kHz and transmits the symbols as a TTR indication signal TTR_I. When the TTR signal is at a high level (i.e. during NEXT interference period), a phase of the TTR indication signal TTR_I leads 45° ahead of that of an original signal. On the other hand, when the TTR signal is at a low level (i.e. during FEXT interference period), a phase of the TTR indication signal TTR_I lags 45° behind that of the original signal.

The remote terminal interprets the TTR indication signal TTR_I to determine symbols of the hyperframe. If the remote terminal starts to receive from A point the signal transmitted from the central office, the remote terminal may detect phases of frames 2000–2004 and precisely determine a symbol of each of the frames 2000–2004 whether it is FEXT interference or NEXT interference. As a result, data inputted after the TTR indication signal can be precisely decoded to data of FEXT interference or NEXT interference period.

However, in the case that the remote terminal of customer premises (i.e. ADSL modem) starts to receive from B point the TTR indication signal (TX) transmitted from the central office, a phase of the frame 1003 is different from those of other frames 1000–1002, and 1004. Thus, a symbol of the frame 1003 cannot be determined as to whether it is FEXT interference or NEXT interference. It is. impossible to precisely determine whether data inputted after the TTR indication signal TTR_I is data of FEXT interference period or data of NEXT interference period. As a result, data cannot be normally decoded.

A need therefore exists for a full-duplex telecommunication system capable of precisely detecting a start position of a data signal inputted after initialization, when the telecommunication system uses a communication line positioned in vicinity of a communication line of a telecommunication system adopting half-duplex data transmission system according to a reference signal.

There is a further need for an ADSL telecommunication system capable of precisely detecting a start position of a data signal inputted after a TTR indication signal, when signals are transceived via a digital subscriber line (DSL) installed with a communication line of TCM-ISDN system in the same cable bundle.

SUMMARY OF THE INVENTION

According to an embodiment of the present invention, a telecommunication system is provided which uses a full-duplex data transmission system that has a second communication line positioned in the vicinity of a first communication line of a half-duplex data transmission system which is synchronized with a reference signal. The telecommunication system comprises a analog-to-digital converter for converting an analog signal received via the second communication line into a digital signal. A first-in first-out (FIFO) buffer serially stores a digital signal outputted from the analog-to-digital converter and serially outputs the digital signal in stored order. A fast Fourier transformer (FFT) transforms the digital signal of a time region outputted from the FIFO buffer into signal of a frequency region, and outputs a phase of a transformed signal. A receive data processor receives a signal of the frequency region outputted from the FFT, and decodes a received signal to an original signal. Also, a synchronization circuit receives a series of the phase information from the FFT and controls the receive data processor to be synchronized with a data signal of output signals from the FFT.

In another embodiment of the present invention, an ADSL system is provided for transceiving data with a central office via digital subscriber line (DSL) positioned in the vicinity of a data transmission line of a time compression multiplexing-integrated services digital network (TCM-ISDN) system. The ADSL system comprises a analog-to-digital converter for converting an analog signal received from the DSL into a digital signal. A FIFO buffer serially stores the digital signal outputted from the analog-to-digital converter and serially outputs the digital signal in stored order. A fast Fourier transformer (FFT) transforms the digital signal of a time region outputted from the FIFO buffer into a signal of a frequency region and outputs a phase of a transformed signal. A receive data processor receives the signal of the frequency region outputted from the FFT, and decodes a received signal to an original signal. A synchronization circuit receives a series of the phase information from the FFT and controls the receive data processor to receive from a start position a data signal of signals output from the FFT.

Preferably, the analog signal received via the digital subscriber line is provided by a TTR indication signal for a predetermined time and then the data signal after that time is over.

The TTR indication signal includes symbols that respectively represent a far end crosstalk (FEXT) interference and a near end crosstalk (NEXT) interference period according to a TTR signal, which is the reference signal of the TCM-ISDN system.

A synchronization circuit comprises a symbol detector, a phase controller, a memory, and a correlator. The symbol detector receives a phase from a fast Fourier transformer (FFT) and detects which symbol corresponds to a currently inputted phase. Also, when a currently inputted phase corresponds to none of symbols, the symbol detector outputs a phase difference between a prior inputted phase and the currently inputted phase. The phase controller controls a FIFO buffer such that digital signals of a time corresponding to the phase difference are removed among the digital signals stored in the FIFO buffer. The memory stores the symbols detected by the symbol detector. The correlator correlates symbols stored in the memory and symbols of frames constituting a hyperframe to control the receive data processor to receive the data signal inputted after the TTR indication signal.

BRIEF DESCRIPTION OF THE DRAWINGS

A more complete appreciation of the invention will be readily apparent with reference to the following detailed description when considered in conjunction with the accompanying drawings, wherein:

FIG. 5 is a table illustrating one hyperframe of an ADSL signal during 34 periods of a TTR signal;

DETAILED DESCRIPTION OF PREFERRED EMBODIMENTS

The present invention will now be described hereinafter with reference to the accompanying drawings, in which preferred embodiments of the invention are shown.

Figure 7:
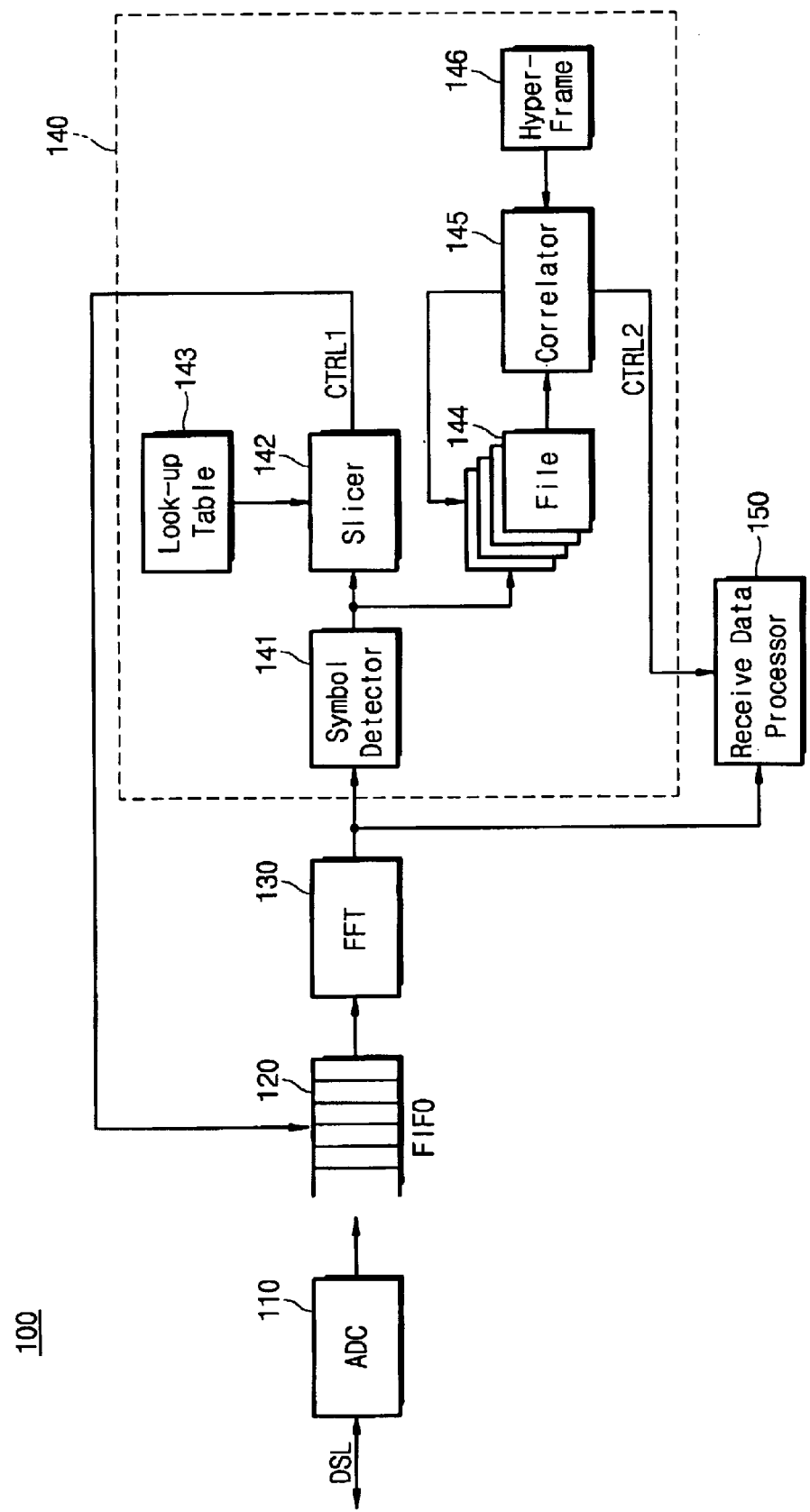
FIG. 7 is a diagram illustrating an ADSL modem according to an embodiment of the present invention.

FIG. 7 is a diagram illustrating an ADSL modem according to an embodiment of the present invention. An ADSL modem 100 comprises an analog-to-digital converter (ADC) 110 for converting an analog signal received via a digital subscriber line (DSL) into a digital signal. A first-in first-out (FIFO) buffer 120 stores a digital signal outputted from the ADC 110 and outputs the digital signal in stored order. A fast Fourier transformer (FFT) 130 transforms a signal of a frame of a time region outputted from the FIFO buffer 120 into a signal of a frequency region and outputs a phase of a transformed signal of the frequency region. A synchronization circuit 140 receives a series of phase information outputted from the FFT 130 and controls the FIFO buffer 120 and a receive data processor 150. Also, the receive data processor 150 decodes a signal outputted from the FFT 130 to an original signal. The receive data processor 150, as is known to those in the art, includes a frequency equalizer, a constellation encoder, a gain scaler, a tone ordering, a rate-converter, a deinterleaver, a descrambler, a forward error corrector, a cyclic redundancy checker, a MUX/SYNC controller, and the like (not shown). Detailed description of the receive data processor 150 will be omitted here for brevity.

When power of a central office (not shown) or an ADSL modem 100 of subscriber's premises is cut off and then supplied again, or when communications between the central office and the ADSL modems of the customer's premises are interrupted due to failure of telephone lines transceiving signals and restoration of the lines to be normal, initialization for communication between the central office and the ADSL modem 100 of the customer premises is performed. The central office according to Annex C outputs a TTR indication signal during the initialization. When the TTR indication signal is received, the ADSL modem 100 according to Annex C performs an operation of setting a start position of a data signal inputted after the TTR indication signal, which will be described in detail hereinafter.

Referring to FIG. 7, an ADC 110 converts a TTR indication signal TTR_I received via a digital subscriber line (DSL) into a digital signal. Converted digital signals are serially stored in the FIFO buffer 120. The FFT 130 transforms the digital signal of a time region during a frame outputted from the FIFO 120 into a signal of a frequency region and outputs a phase $\theta_i$ of a converted signal of the frequency region.

Figure 8A:
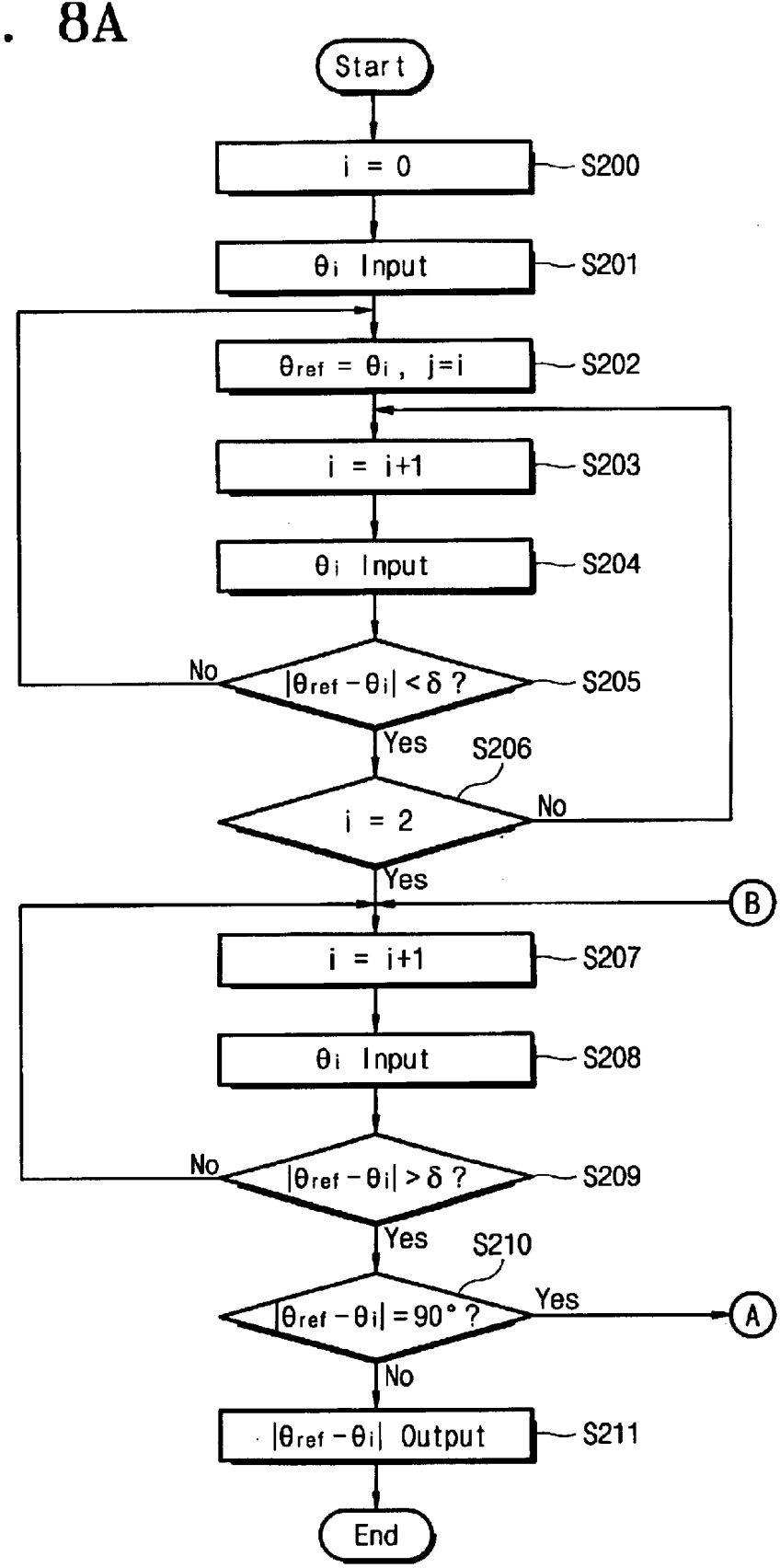
FIGS. 8A and 8B are flowcharts illustrating a process that a symbol detector detects symbols included in a TTR indication signal.
Figure 8B:
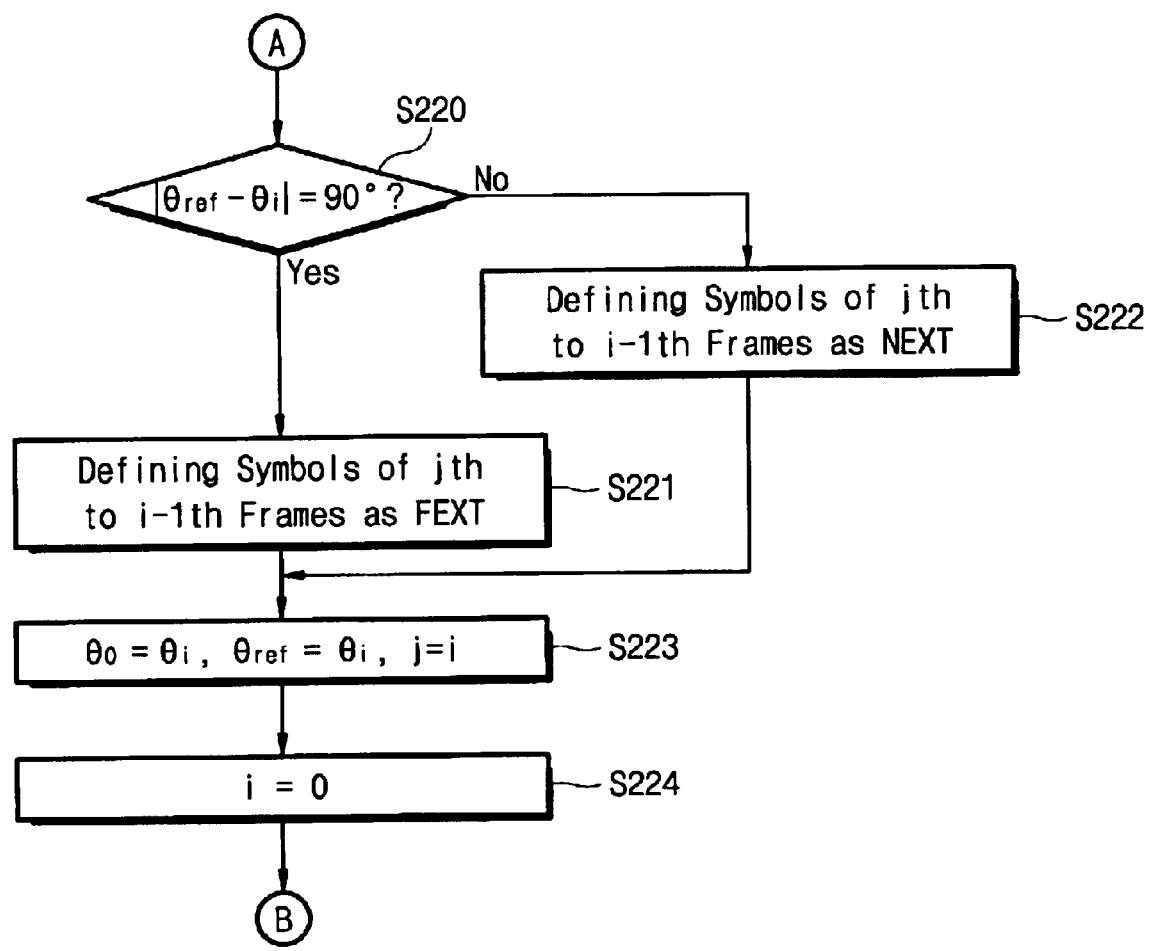

The symbol detector 141 receives the phase $\theta_i$ outputted from the FFT 130 and detects a symbol of the frame. Since the TTR indication signal TTR_I has a phase difference of 90° between a FEXT interference and a NEXT interference period, the symbol detector 141 cannot determine the symbol by only one phase from the FFT 130. Typically, the symbol detector 141 can determine a phase of each frame based on correlations between phases of a series of frames. FIGS. 8A and 8B illustrate a process that the symbol detector 141 detects symbols included in the TTR indication signal TTR_I.

Referring to FIG. 8A, in step S200, the symbol detector 141 initializes a count value (i) to 0. In step S201, the symbol detector 141 receives a phase $\theta_i$ outputted from the FFT 130. In step S202, the symbol detector 141 sets a reference phase $\theta_{ref}$ to a current phase $\theta_i$ and a start value j to a count value (i). In step S202, the count value (i) is increased by 1. In step S204, the symbol detector 141 determines whether or not an absolute value (i.e., $|\theta_{ref}-\theta_i|$) of difference between the reference phase $\theta_{ref}$ and ith phase $\theta_i$ is less than a critical value $\delta$. A phase of the TTR indication signal TTR_I received via the DSL line is influenced by noise. The critical value $\delta$ is a permissible error value caused by the noise. When the absolute value of difference between the reference phase $\theta_{ref}$ and ith phase $\theta_i$ is less than the critical value $\delta$, symbols of the frames corresponding to each of the reference phase $\theta_{ref}$ and ith phase $\theta_i$ are regarded as the same. When the absolute value of difference between the reference phase $\theta_{ref}$ and ith phase $\theta_i$ is equal to or larger than the critical value $\delta$, the symbols of the frames corresponding to each of the reference phase $\theta_{ref}$ and ith phase $\theta_i$ are regarded as different. When the absolute value of difference between the reference phase $\theta_{ref}$ and ith phase $\theta_i$ is smaller than a critical value $\delta$, the control proceeds to step S206. Otherwise, the control returns to step S202.

In step S206, the symbol detector 141 determines whether or not a count value (i) is 2. As a result, if the count value (i) is 2, the control proceeds to step S207. Otherwise, the control returns to step S203. Accordingly, in steps S202 to S206, when subsequent 3 phases out of phases inputted from the FFT 130 are the identical, the control proceeds to step S207. As can be known from the hyperframe illustrated in FIG. 5, the present embodiment is to use a characteristic that an unobvious frame, which cannot be determined as to whether it belongs to FEXT interference or NEXT interference, always follows at least 3 frames having an identical symbol of FEXT interference or NEXT interference. If a phase of a first frame outputted from the FFT 130 is different from that of a second frame, it cannot be discerned which of the first and second frames is the unobvious frame that cannot determine symbols. In this case, a frame having the different phase is determined as to whether it is an unobvious frame, when phases of next frames are received, at least 3 frames serially inputted are found to be identical, and a phase different from those of the prior frames is inputted.

In step S207, the symbol detector 141 increases the count value (i) by 1. In step S208, the symbol detector 141 receives the phase $\theta_i$ from the FFT 130. In step S209, the symbol detector 141 determines whether or not absolute value (i.e., $|\theta_{ref}-\theta_i|$) of difference between the reference phase $\theta_{ref}$ and ith phase $\theta_i$ is larger than a critical value $\delta$. When an absolute value of difference between the reference phase $\theta_{ref}$ and ith phase $\theta_i$ is larger than a critical value $\delta$, the control proceeds to step S210. Otherwise, the control returns to step S207. In the case that an absolute value of difference between the reference phase $\theta_{ref}$ and ith phase $\theta_i$ is larger than a critical value $\delta$, symbols of frames corresponding to each of the reference phase $\theta_{ref}$ and ith phase $\theta_i$ are different from each other.

In step S210, the symbol detector 141 determines whether or not an absolute value of difference between the reference phase $\theta_{ref}$ and ith phase $\theta_i$ is 90°. If the absolute value of difference between the reference phase $\theta_{ref}$ and ith phase $\theta_i$ is 90°, the control proceeds to step S220 of FIG. 8B. Otherwise, the control proceeds to step S211.

In step S211, the symbol detector 141 outputs an absolute value of difference between the reference phase $\theta_{ref}$ and ith phase $\theta_i$ to a slicer 142. The slicer 142 calculates an overlapped time corresponding to a phase difference $|\theta_{ref}-\theta_i|$ outputted from the symbol detector 141 by referring to a look-up table 143 and outputs a control signal CTRL1 such that the FIFO buffer 120 deletes data corresponding to overlapped times.

Figure 9:
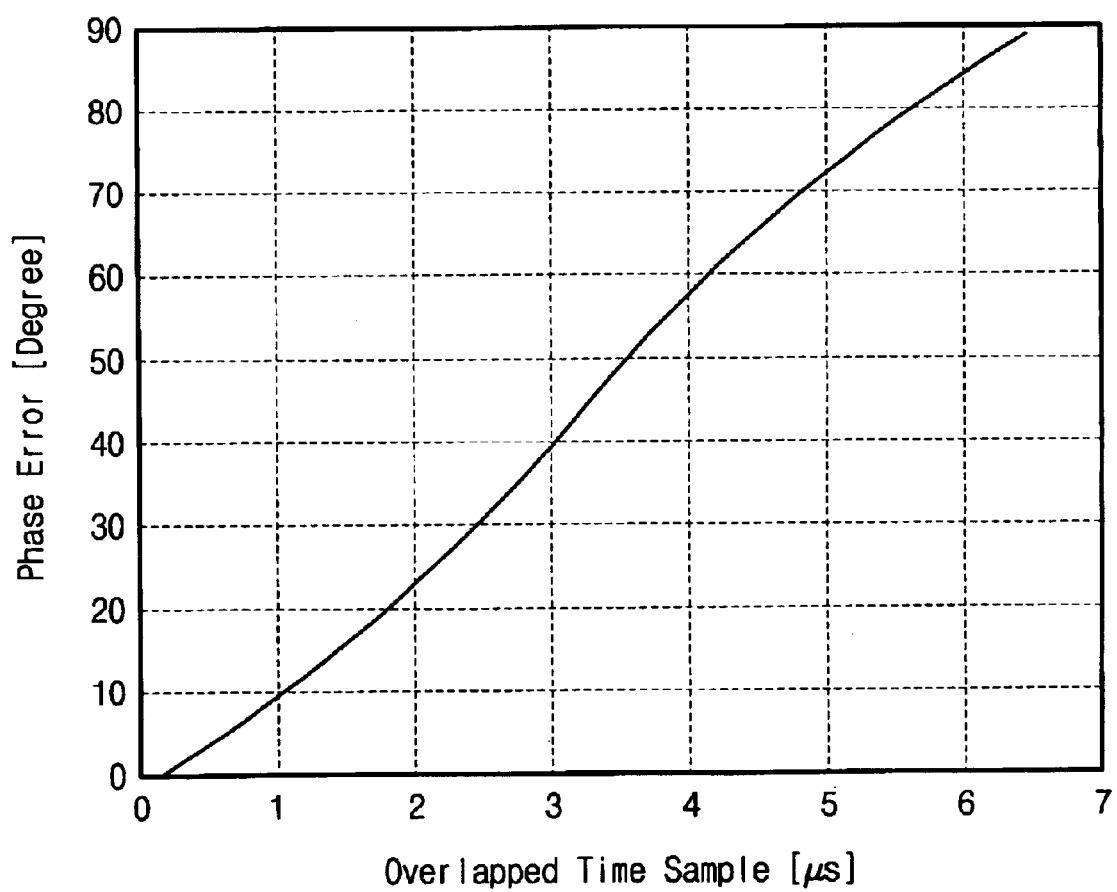
FIG. 9 shows a correlation between absolute values of phase differences and overlapped times.

FIG. 9 is a diagram illustrating a correlation between absolute values $|\theta_{ref}-\theta_i|$ of the phase differences stored in the look-up table 143 and the overlapped times. Referring to FIG. 9, for example, if an absolute value of difference between the reference phase $\theta_{ref}$ and $\theta_i$ is 40°, overlapped time is about 4.0 $\mu$s. At this time, the slicer 142 outputs a control signal CTRL1 to delete data corresponding to the time of 4.0 $\mu$s among data stored in the FIFO 120. Accordingly, when the TTR indication signal TTR_I outputted from the FIFO buffer 120 is fast Fourier transformed (FFT), a transformed signal of a frame includes one of FEXT interference and NEXT interference, and an unobvious signal, which cannot be determined to be FEXT interference or NEXT interference, is removed.

Referring to FIG. 8B, in step S220, the phase detector 141 determines whether or not difference ($\theta_{ref}-\theta_i$) between the reference phase $\theta_{ref}$ and ith phase $\theta_i$ is +90°. As a result, if difference ($\theta_{ref}-\theta_i$) between the reference phase $\theta_{ref}$ and ith phase $\theta_i$ is +90°, the control proceeds to step S221, thereby defining all symbols of jth to i-1th frames as FEXT interference. Inversely, if difference ($\theta_{ref}-\theta_i$) between the reference phase $\theta_{ref}$ and ith phase $\theta_i$ is not +90° (i.e. −90°), the control proceeds to step S221, thereby defining all symbols of jth to i-1th frames as NEXT interference.

In step S223, the symbol detector 141 sets $\theta_0$ to $\theta_i$, $\theta_{ref}$ to $\theta_i$, and j to i. In step S224, the symbol detector 141 initializes a count value (i) to 0, and the control returns to step S207.

Referring again to FIG. 6, the ADSL modem 100 of the subscriber's premises can precisely determine a symbol of each frame, when the TTR indication signal TTR_I is received from A point where TTR_I is synchronized with the TTR signal. However, in the case that an initial receive point is other than A point, there may be an unobvious frame, which cannot be determined to be FEXT interference or NEXT interference.

Figure 1:
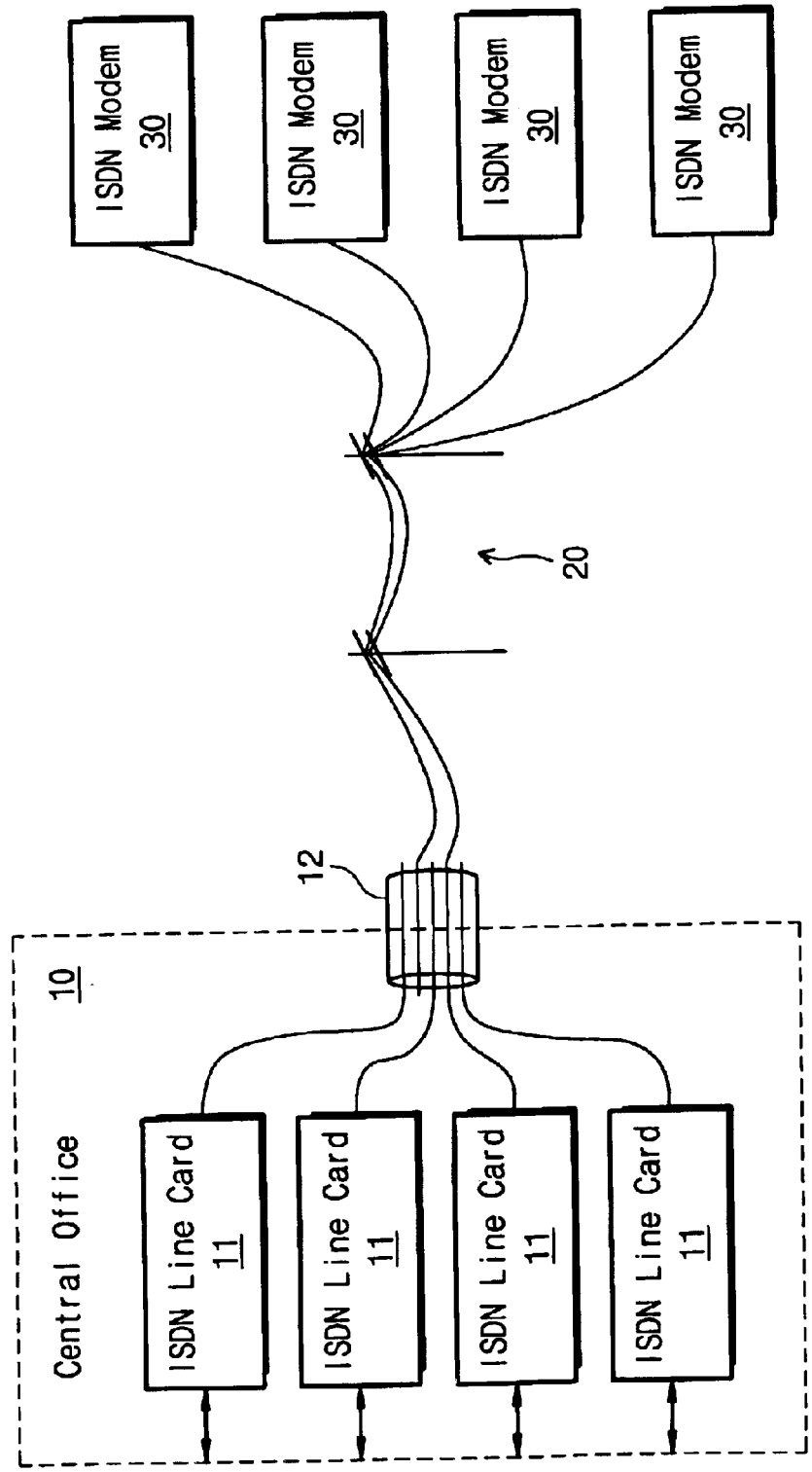
FIG. 1 is a diagram of conventional ISDN line telecommunication system which has interference.
Figure 2:
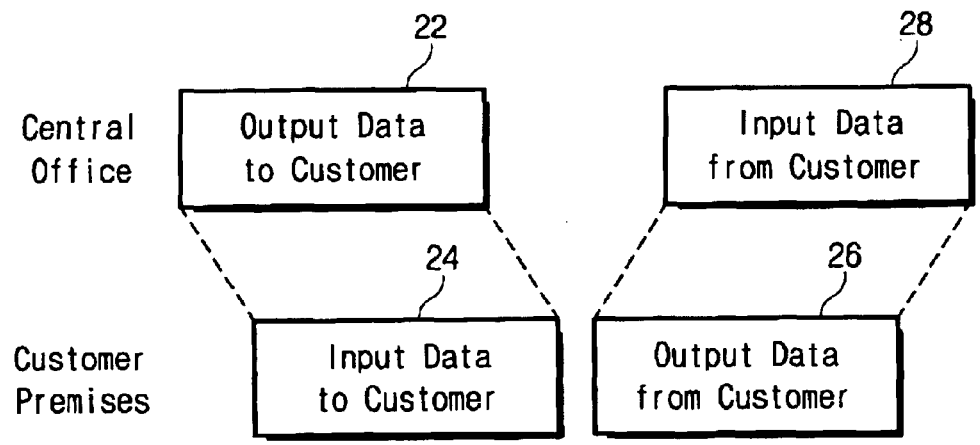
FIG. 2 is a timing diagram for communicating in conventional TCM-ISDN line telecommunication system.
Figure 3:
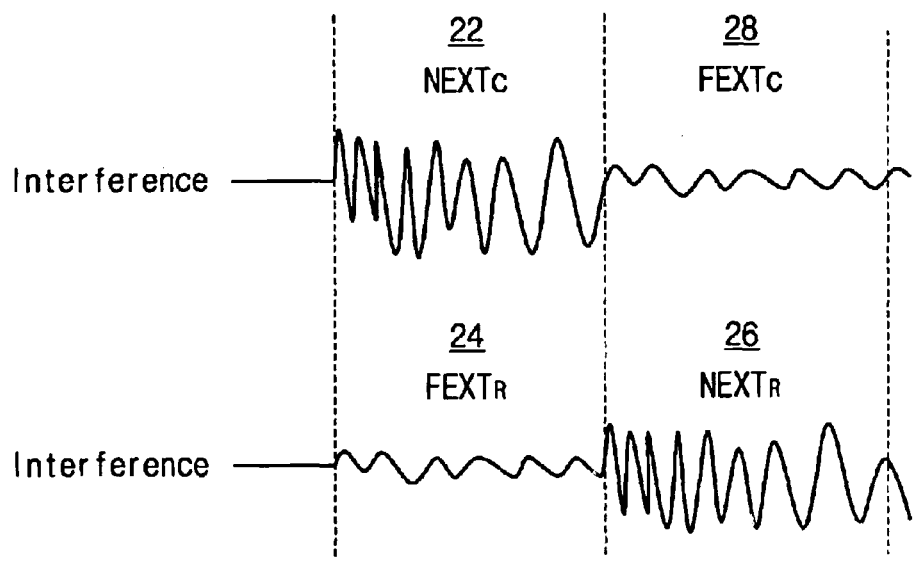
FIG. 3 is a diagram of interference at a central office when several ISDN lines transmit data at the same time.
Figure 4:
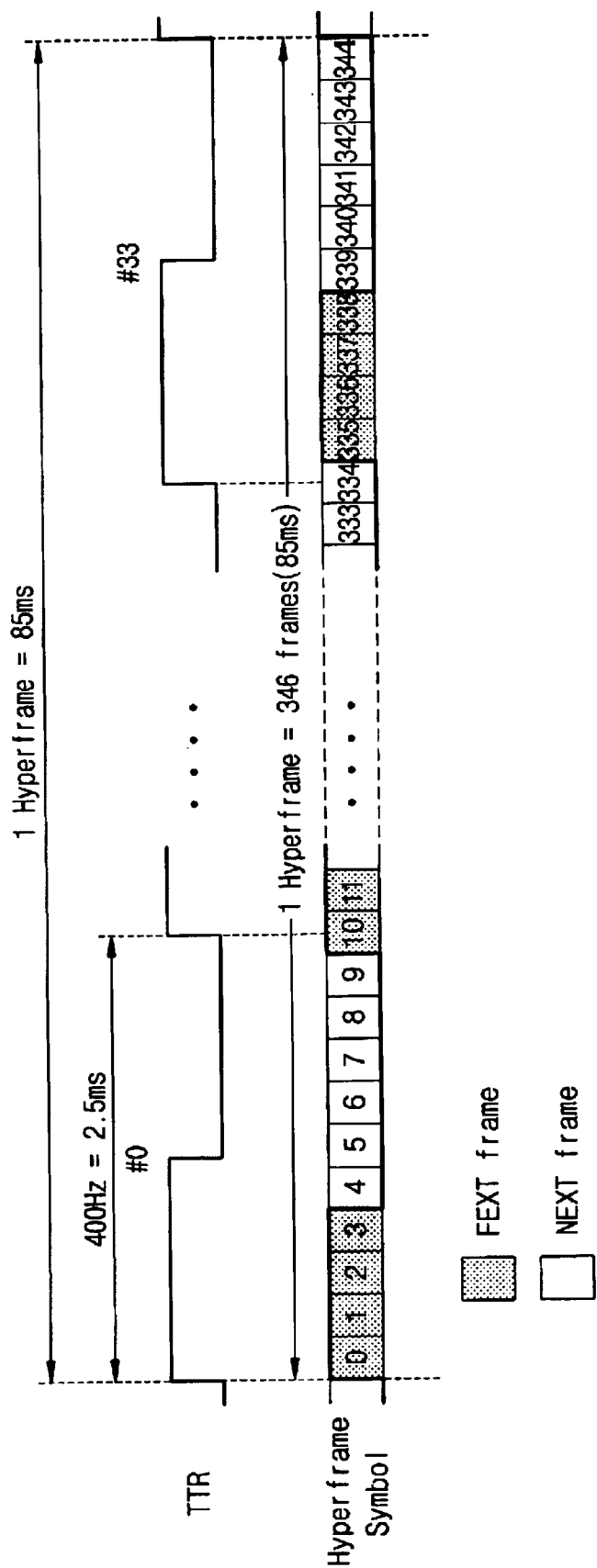
FIG. 4 is a diagram illustrating hyperframe symbols of an ADSL downstream signal according to an embodiment of the present invention.
Figure 6:
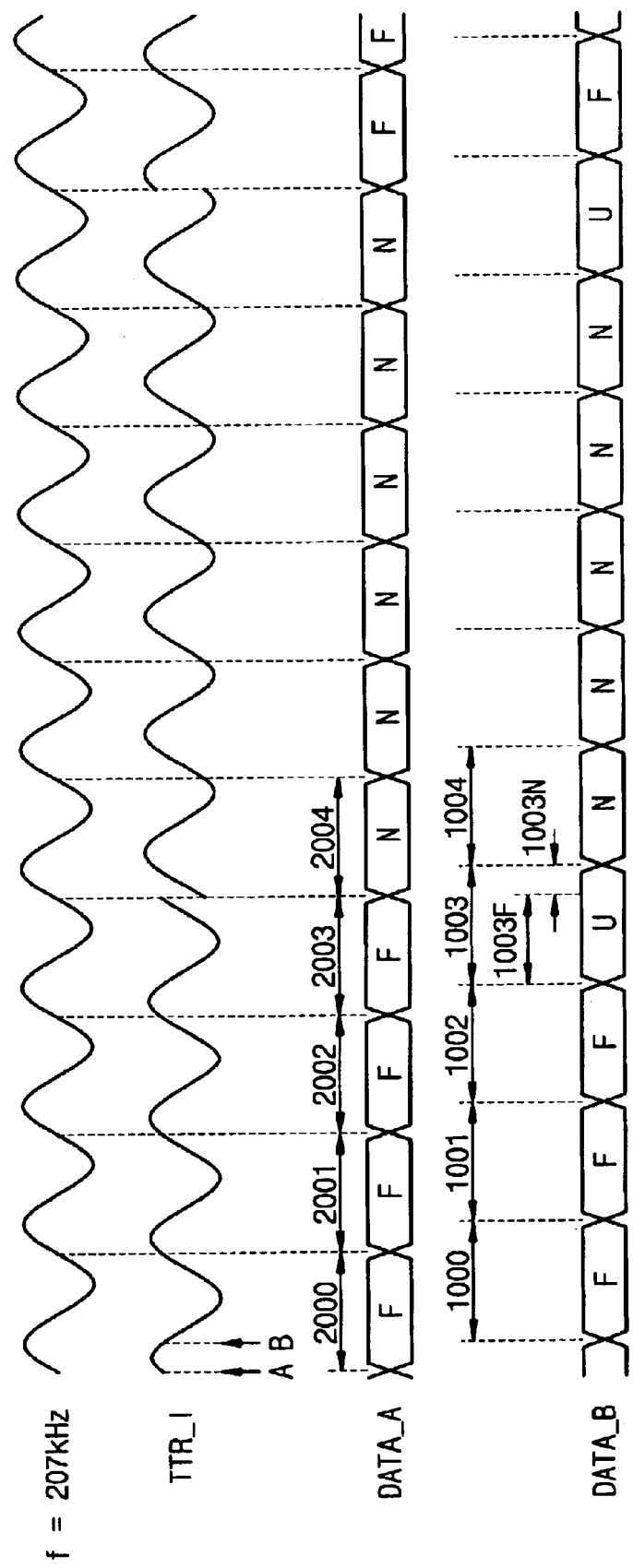
FIG. 6 is a timing diagram exemplarily illustrating that a remote terminal recognizes a symbol included in a TTR indication signal transmitted from a central office.

For example, when the ADSL modem 100 of the subscriber's premises initially receives the TTR indication signal TTR_I from B point, operations of the symbol detector 141 will be described herein to explain existence of the unobvious frame. To begin with, the symbol detector 141 receives a phase $\theta_0$ of 0th frame 1000 outputted from the FFT 130 (step S201) and sets a reference phase $\theta_{ref}$ to the phase $\theta_0$ of the 0th frame 1000 (step S201). At this time, a start value j becomes 0. Next, the symbol detector 141 receives a phase $\theta_1$ of 1st frame 1001 (step S204) and determines whether or not an absolute value of difference between the reference phase $\theta_{ref}$ and the present phase $\theta_1$ is smaller than a critical value $\delta$ (step S205). As illustrated in FIG. 6, because phases of the 0th and 1st frames 1000 and 1001 are the identical and the count value (i) is 1, the control returns to step S203. Then, the symbol detector 141 receives a phase $\theta_2$ of 2nd frame 1002 outputted from the FFT 130 (step S204). The phase $\theta_{ref}$ of the 0th frame 1000 or a reference phase is equal to the phase $\theta_2$ of the 2nd frame 1002 and the count value (i) is 2, so the control proceeds to step S207. The symbol detector 141 receives a phase $\theta_3$ of 3rd frame 1003 outputted from the FFT 130 (step S208). Because the phase $\theta_0$ of the 0th frame 100 or the reference phase is different from the phase $\theta_3$ of the 3rd frame 1003 (step S209) and the difference therebetween is not 90° (step S210), the symbol detector 141 outputs an absolute value of difference between the phase $\theta_0$ of the 0th frame 1000 and the phase $\theta_3$ of the 3rd frame 1003 (step S211). The slicer 142 calculates an overlapped time corresponding to the difference between the reference phase $\theta_0$ and the phase $\theta_3$ of the 3rd frame 1003 and outputs a control signal CTRL1. The 3rd frame 1003 includes a signal 1003F of the FEXT interference period and a signal 1003N of the NEXT interference period. The difference between the phase $\theta_3$ of the 3rd frame 1003 and the phase $\theta_0$ of the 0th frame 100 is dependant on the signal 1003N of the NEXT interference period included in the 3rd frame 1003. The control signal CTRL1 is for deleting signals among the TTR indication signal TTR_I stored in the FIFO buffer 120 based on a predetermined time, such that the signals of the FEXT interference and NEXT interference periods are not simultaneously included in a frame.

After the foregoing processes, each frame outputted from the FIFO buffer 120 includes a signal of only one of the FEXT interference and NEXT interference periods. For instance, in FIG. 6, the ADSL modem 100 starts to receive from A point a TTR indication signal TTR_I. The symbol detector 141 continues to determine a symbol of the signal outputted from the FFT 130. Since a frame includes a signal of only one of the FEXT interference and NEXT interference periods, the frames include the same symbol when phases of the subsequent two frames are the same. However, when the subsequent two frames have difference of +90° or −90°, the frames have different symbols.

Referring again to FIGS. 6, 8A, and 8B, when the FIFO 120 outputs a digital signal from A point the TTR indication signal TTR_I, operations of the symbol detector 141 will be described hereinafter. The symbol detector 141 receives a phase $\theta_0$ of 0th frame 2000 outputted form the FFT 130 (step S201) and sets a reference phase $\theta_{ref}$ to the present phase $\theta_0$ (step S202). At this time, a start value j is set to a count value (i). The symbol detector 141 serially receives a phase $\theta_1$ of 1st frame 2001 outputted from the FFT 130 and a phase $\theta_2$ of the 2nd frame 2001, and the control proceeds to step S207 (steps S203-S206). The symbol detector 141 receives a phase $\theta_3$ of 3rd frame 2003 outputted from the FFT 130 (steps S207–S208). Because the reference phase $\theta_0$ is equal to the phase $\theta_3$ of the 3rd frame 2003 (step S209), the symbol detector 141 receives a phase $\theta_4$ of 4th frame 2004 outputted from the FFT 130. Difference between the reference phase $\theta_0$ and the phase $\theta_4$ of the 4th frame 2004 is +90°. As stated above, the TTR indication signal TTR_I leads 45° ahead of an original signal ORIGIN at the FEXT interference period, but lags 45° behind the original signal ORIGIN at the NEXT interference period. Therefore, when a prior frame is a FEXT signal and a present frame is a NEXT signal, a phase difference therebetween is +90°. Also, when the prior frame is a NEXT signal and the present frame is a FEXT signal, a phase difference therebetween is −90°. Accordingly, the symbol detector 141 defines a symbol of each of the 0th to 3rd frames 2000–2003 as FEXT interference (steps S210, S220, and S221). Defined symbols of the 0th to 3rd frames 2000–2003 are stored in a file 144 of FIG. 7.

According to the foregoing method, symbols of the 345 frames are stored in the file 144. The correlator 145 correlates a pre-defined hyperframe 146 to frames stored in the file 144 to discern which frame of the hyperframe 146 is the first frame stored in the file 144. The hyperframe 146 is illustrated in FIG. 5. The first frame stored in the file 144 may be one of $0^{th}$ frame to $344^{th}$ frame of the hyperframe 146.

Figure 10:
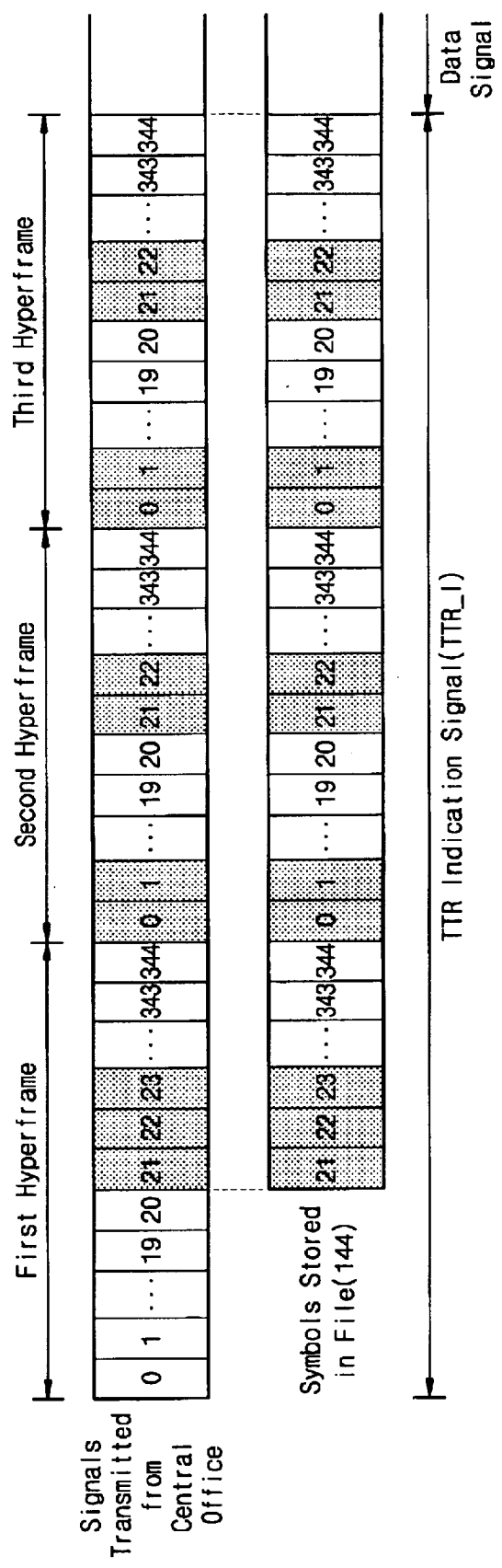
FIG. 10 is a diagram exemplarily illustrating that a first frame stored in a file is a $21^{st}$ frame of a hyperframe.

FIG. 10 exemplarily illustrates that the first frame stored in the file 144 is the $21^{st}$ frame of the hyperframe 146. Even if the first frame stored in the file 144 is the $21^{st}$ frame of the hyperframe 146, the central office typically starts to transmit data from the first frame of the hyperframe 146.

For example, if a central office transmits a TTR indication signal TTR_I during 3 hyperframes and then transmits a data signal, the ADSL modem 100 receives the TTR indication signal TTR_I during 3 hyperframes and then receives the data signal. However, as illustrated in FIG. 10, if the ADSL modem 100 starts to receive data from the $21^{st}$ frame of the TTR indication signal TTR_I, the ADSL mistakenly detects a start position of the data signal. Thus, the correlator 145 outputs a control signal CTRL2 such that FEQ 150 starts to receive data from a start position of the data signal outputted from the FFT 130 after the correlator 145 discerns which frame of the hyperframe is the first frame stored in the file 144.

The FEQ 150 receives the data signal outputted from the FFT 130 in response to the control signal CTRL2. Accordingly, a data received via the digital subscriber line DSL is decoded to an original data by the FEQ 150 and the receive data processor 150.

As set forth before, when signals are transceived via a digital subscriber line (DSL) installed with communication lines of a TCM-ISDN system in the same cable bundle, a telecommunication system according to the present invention can precisely detect a start position of a data signal inputted after a TTR indication signal.

While the present invention has been described in connection with specific and preferred embodiments thereof, it is capable of various changes and modifications without departing from the spirit and scope of the invention. It should be appreciated that the scope of the invention is not limited to the detailed description of the invention hereinabove, which is intended merely to be illustrative, but rather comprehends the subject matter defined by the following claims.

What is claimed is:

1. A telecommunication system, which communicates using a full-duplex data transmission system via a second communication line positioned in vicinity of a first communication line of a system that is synchronized with a reference signal and uses half-duplex data transmission system, the telecommunication system comprising:

an analog-to-digital converter for converting an analog signal received via the second communication line into a digital signal, wherein the analog signal is a TCM timing reference (TTR) indication signal during a predetermined time and the data signal after that time is over;

a first-in first-out (FIFO) buffer for serially storing the digital signal outputted from the analog-to-digital converter and for serially outputting the digital signal in stored order;

a fast Fourier transformer (FFT) for converting the digital signal of a time region outputted from the FIFO buffer into a signal of a frequency region and for outputting a phase of a transformed signal;

a receive data processor for receiving the signal of the frequency region outputted from the FFT to decode a received signal to an original signal; and a synchronization circuit for receiving a series of phase information from the FFT and for controlling the receive data processor to synchronize with the data signal among signals output from the FFT;

wherein the synchronization circuit comprises:

a symbol detector for receiving the phase from the FFT, for detecting which one of the symbols corresponds to a currently inputted phase, and for outputting difference between a prior inputted phase and the currently inputted phase when the currently inputted phase corresponds to none of the symbols;

a phase controller for controlling the FIFO buffer such that digital signals of a time corresponding to the phase difference are removed among the digital signals stored in the FIFO buffer;

a memory for storing the symbols detected by the symbol detector; and a correlator for correlating the symbols stored in the memory and symbols of frames constituting a hyperframe and for controlling the receive data processor to receive the data signal inputted after the TTR indication signal.

2. The telecommunication system as claimed in claim 1, wherein the system communicating using the full-duplex data transmission system via the second communication line is an asymmetric digital subscriber line (ADSL) system.

3. The telecommunication system as claimed in claim 2, wherein the system communicating using the half-duplex data transmission system via the first communication line is a time compression multiplexing-integrated services digital network (TCM-ISDN) system.

4. The telecommunication system as claimed in claim 3, wherein the TTR indication signal comprises symbols that respectively represent far end crosstalk (FEXT) interference and near end crosstalk (NEXT) interference periods according to a TTR signal, which is the reference signal of the TCM-ISDN system.

5. The telecommunication system as claimed in claim 1, wherein the phase controller comprises:

a look-up table for storing correlation between phase differences and overlapped times; and a slicer, by referring to the look-up table, for controlling the FIFO buffer to remove the digital signals of an overlapped time corresponding to the phase difference.

6. An ADSL system for transceiving data with a central office via digital subscriber line (DSL) positioned in the vicinity of a data transmission line of time compression multiplexing-integrated services digital network (TCM-ISDN) system, the ADSL system comprising:

an analog-to-digital converter for converting analog signal received via the digital subscriber line (DSL) into a digital signal, wherein the analog signal is a TTR indication signal during a predetermined time and the data signal after that time is over;

a first-in first-out buffer for serially storing the digital signal outputted from the analog-to-digital converter and serially outputting the digital signal in stored order;

a fast Fourier transformer (FFT) for converting the digital signal of a time region outputted from the FIFO buffer into a signal of a frequency region and for outputting a phase of a converted signal;

a receive data processor for receiving the signal of the frequency region outputted from the FFT to decode a received signal to an original signal; and a synchronization circuit for receiving a series of a phase information from the FFT to control the receive data processor to receive the signal within the frequency from a start position of a data signal among signals output from the FFT;

wherein the synchronization circuit comprises:

a symbol detector for receiving the phase from the FFT, for detecting which one of the symbols corresponds to a currently inputted phase, and for outputting difference between a prior inputted phase and the currently inputted phase when the currently inputted phase corresponds to none of the symbols;

a phase controller for controlling the FIFO buffer such that the digital signals of a time corresponding to the phase difference are removed among the digital signals stored in the FIFO buffer;

a memory for storing the symbols detected by the symbol detector; and a correlator for correlating the symbols stored in the memory and symbols of frames constituting a hyperframe and for controlling the receive data processor to receive the data signal inputted after the TTR indication signal.

7. The ADSL system as claimed in claim 6, wherein the TTR indication signal comprises symbols that respectively represent far end crosstalk (FEXT) interference and near end crosstalk (NEXT) interference periods according to a TTR signal that is a reference signal of the TCM-ISDN system.

* * * * *